US012067238B2

(12) United States Patent
Tadokoro

(10) Patent No.: US 12,067,238 B2
(45) Date of Patent: Aug. 20, 2024

(54) MEMORY SYSTEM AND CONTROL METHOD OF MEMORY SYSTEM FOR SHARED MEMORY BASED MESSAGE ROUTING MODULE

(71) Applicant: KIOXIA CORPORATION, Tokyo (JP)

(72) Inventor: Mitsunori Tadokoro, Fujisawa Kanagawa (JP)

(73) Assignee: Kioxia Corporation, Tokyo (JP)

( * ) Notice: Subject to any disclaimer, the term of this patent is extended or adjusted under 35 U.S.C. 154(b) by 68 days.

(21) Appl. No.: 17/901,837

(22) Filed: Sep. 1, 2022

(65) Prior Publication Data

US 2023/0305705 A1    Sep. 28, 2023

(30) Foreign Application Priority Data

Mar. 22, 2022    (JP) ................................. 2022-045553

(51) Int. Cl.
G06F 3/06    (2006.01)

(52) U.S. Cl.
CPC ............ G06F 3/061 (2013.01); G06F 3/0659 (2013.01); G06F 3/0679 (2013.01)

(58) Field of Classification Search
CPC ...... G06F 3/061; G06F 3/0679; G06F 3/0659; G06F 3/0653; G06F 9/544; G06F 9/546; G06F 2212/1041; H04L 49/108; H04L 49/25; H04L 49/256; H04L 49/3018; H04L 49/3027; H04L 49/351; H04L 2012/5681; H04L 2012/5679
See application file for complete search history.

(56) References Cited

U.S. PATENT DOCUMENTS 6,535,516 B1 *   3/2003   Leu ...................... H04L 49/90
                                                    370/395.72
8,307,074 B1    11/2012   Martin et al.
(Continued)

FOREIGN PATENT DOCUMENTS

JP    H09-101901 A    4/1997
JP    2002-149619 A   5/2002

OTHER PUBLICATIONS

JPHOSTO19014 "System and Method for Message Communication Between Processes Performer on Personal Computer Operated By Multiprocess", Applicants: NTT Data Tsushin KK Inventors: Kobayashi Mayumi, Adachi Sadamasa, Asanuma Kazuhiko (provided in IDS filed Sep. 1, 2022 ) (Year: 1997).*

*Primary Examiner* — Tracy C Chan
(74) *Attorney, Agent, or Firm* — Kim & Stewart LLP

(57) ABSTRACT

A memory system includes a non-volatile memory including first and second chips, a processor configured to generate first messages in response to a command from an external device, the first messages addressed to the first and second chips, and a repeater including an input port to which the first messages are input and first and second output ports connected to the first and second chips. The repeater is configured to write the first messages input via the input port to a shared memory, read the first message addressed to the first chip from the shared memory when the first chip is ready, and output the first message to the first chip through the first output port, and read the first message addressed to the second chip when the second chip is ready, and output the first message to the second chip through the second output port.

20 Claims, 11 Drawing Sheets

(56) References Cited

U.S. PATENT DOCUMENTS

| | | | |
|---|---|---|---|
| 2003/0147410 A1* | 8/2003 | Hsu | H04L 49/351 |
| | | | 370/474 |
| 2017/0068478 A1 | 3/2017 | Nakatsuka et al. | |
| 2020/0301834 A1 | 9/2020 | Tadokoro | |

* cited by examiner

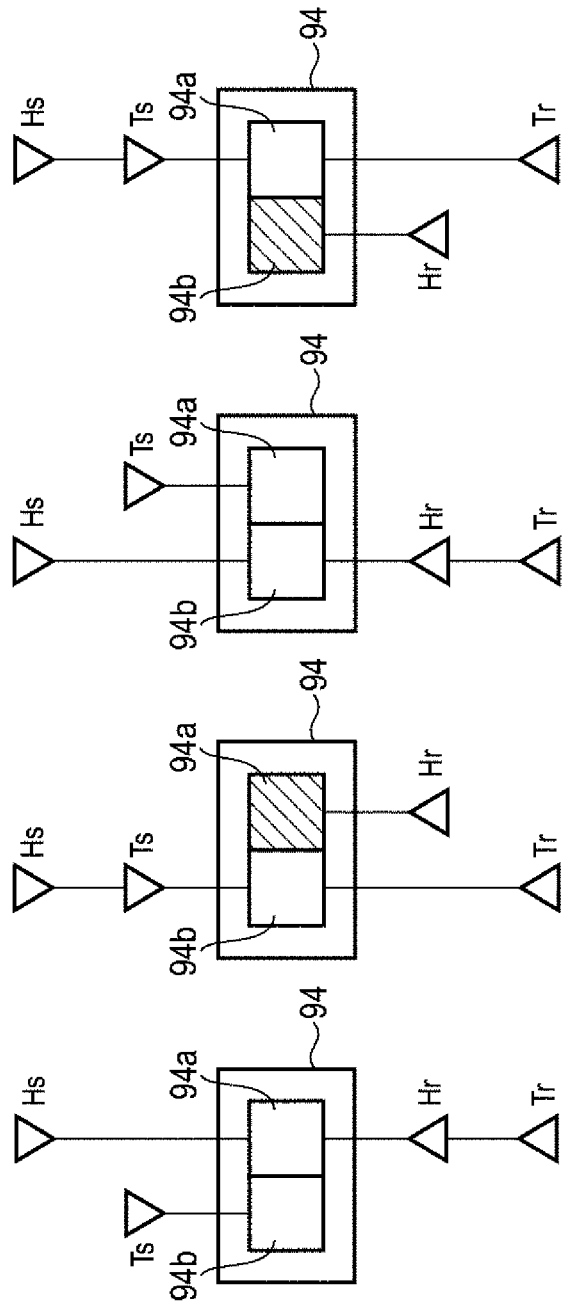

FIG. 10A

| HP | TP | NUMBER OF MESSAGES |
|---|---|---|
| Null | 58h | 0 |

FIG. 10B

| HP | TP | NUMBER OF MESSAGES |
|---|---|---|
| 58g | 58g | 1 |

FIG. 10C

| HP | TP | NUMBER OF MESSAGES |
|---|---|---|
| 58g | 58a | 2 |

FIG. 12A

| HP | TP | NUMBER OF MESSAGES |
|---|---|---|
| 58g | 58a | 2 |

FIG. 12B

| HP | TP | NUMBER OF MESSAGES |
|---|---|---|
| 58a | 58a | 1 |

FIG. 12C

| HP | TP | NUMBER OF MESSAGES |
|---|---|---|
| Null | 58a | 0 |

MEMORY SYSTEM AND CONTROL METHOD OF MEMORY SYSTEM FOR SHARED MEMORY BASED MESSAGE ROUTING MODULE

CROSS-REFERENCE TO RELATED APPLICATION(S)

This application is based upon and claims the benefit of priority from Japanese Patent Application No. 2022-045553, filed Mar. 22, 2022, the entire contents of which are incorporated herein by reference.

FIELD

Embodiments described herein relate generally to a memory system and a control method of a memory system.

BACKGROUND

A memory system for storing data includes a non-volatile semiconductor memory and a controller. Such a non-volatile memory includes a plurality of memory chips. The controller is an integrated circuit including a processing unit, a repeater, and a plurality of memory controllers.

The processing unit divides a command received from an external device into a plurality of requests. A command is issued by an external device to instruct the memory system to perform some operation. A request is issued by the controller to instruct the non-volatile memory to perform some operation. The processing unit transmits such a request to the repeater.

The repeater selects one memory controller among the plurality of memory controllers based on a received request and transmits the received request to the selected memory controller. That is, the repeater has a function of a request receiver and a function of a request transmitter. The repeater includes a queue (memory) having a first-in first-out (FIFO) structure for storing received requests. Requests in the queue are output (read) in the written order (that is, in the order received). Therefore, even if a memory controller with a stored request is presently available, that memory controller has to wait until any other earlier stored requests for other memory controllers are handled.

BRIEF DESCRIPTION OF THE DRAWINGS

FIG. 7A depicts a queue in an empty state according to a first embodiment.

FIG. 7B depicts a queue in a full state according to a first embodiment.

FIG. 7C depicts a queue in an empty state according to a first embodiment.

FIG. 7D depicts a queue in a full state according to a first embodiment.

FIG. 10A depicts a linked list according to a first embodiment at a first timing.

FIG. 10B depicts a linked list according to a first embodiment at a second timing.

FIG. 10C depicts a linked list according to a first embodiment at a third timing.

FIG. 12A depicts a linked list according to a first embodiment at a fourth timing.

FIG. 12B depicts a linked list according to a first embodiment at a fifth timing.

FIG. 12C depicts a linked list according to a first embodiment at a sixth timing.

DETAILED DESCRIPTION

Figure 1:
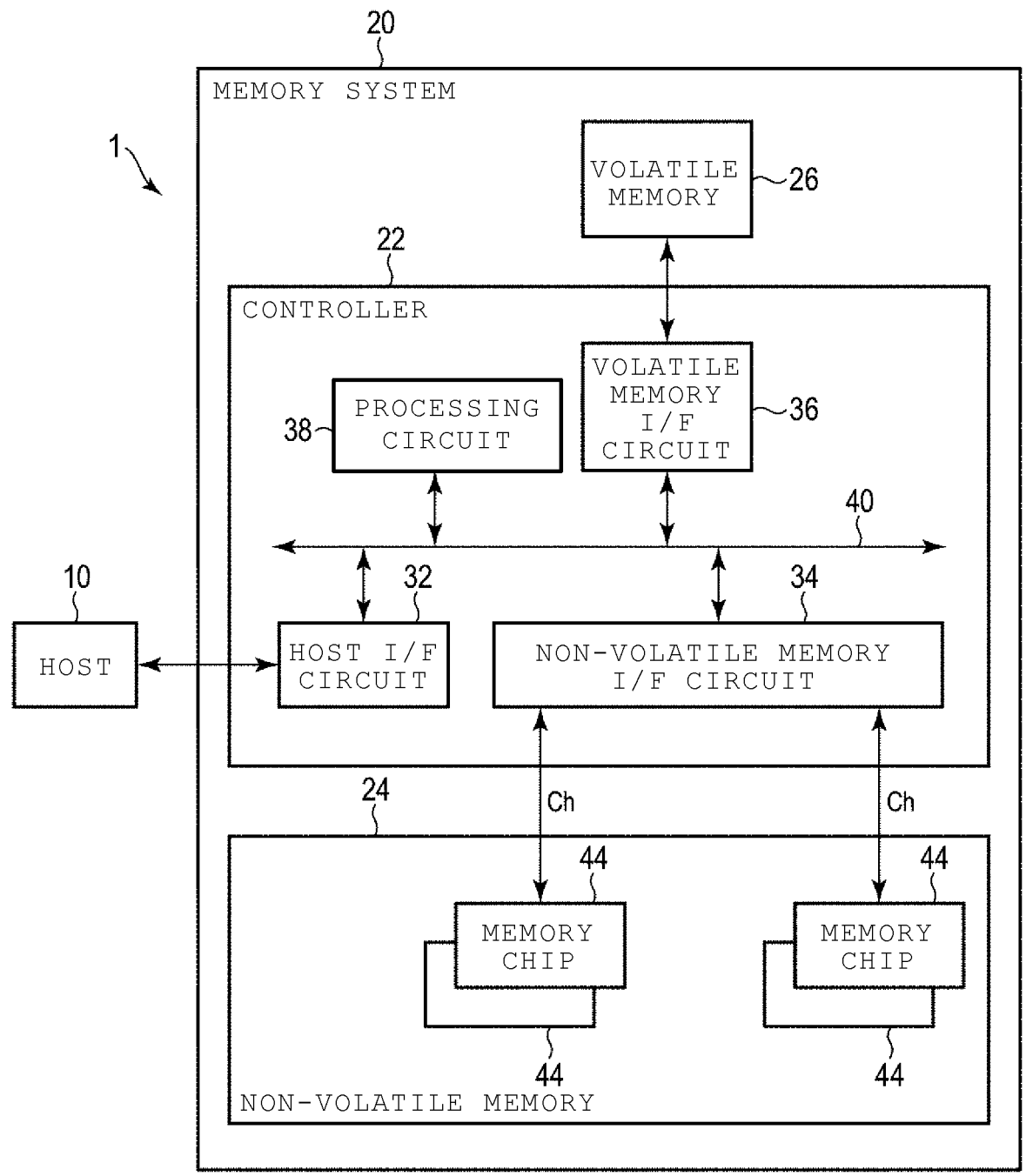
FIG. 1 is a block diagram illustrating an information processing system according to a first embodiment.

Embodiments provide a memory system and a control method capable of improving performance.

In general, according to one embodiment, a memory system includes a non-volatile memory including first and second chips and a processor configured to generate a plurality of first messages in response to a first command received from an external device. The first messages include a first message addressed to the first chip and a first message addressed to the second chip. The memory system further includes a repeater including a first input port to which the first messages are input, a first output port connected to the first chip, and a second output port connected to the second chip. The repeater is configured to write the first messages input via the first input port to a shared memory, read the first message addressed to the first chip from the shared memory when the first chip is ready for receiving a message, and output the read first message to the first chip through the first output port, and read the first message addressed to the second chip from the shared memory when the second chip is ready for receiving a message, and output the read second message to the second chip through the second output port.

Hereinafter, certain example embodiments of the present disclosure will be described with reference to the drawings. The following describes certain devices and methods embodying technical concepts and ideas of the present disclosure and such devices and methods are non-limiting. In the drawings, the relationship and ratio of dimensions between elements may differ from each other. Same elements shown in different drawings will be given the same reference number. A plurality of names may be given to any one element, but these provided names are merely examples of possible names.

FIG. 1 is a block diagram illustrating an information processing system 1 according to a first embodiment. The information processing system 1 includes a host 10 and a memory system 20.

The host 10 is an information processing device. The host 10 transmits various commands to the memory system 20.

The memory system 20 is a system for storing data. The memory system 20 is also referred to as a solid state drive (SSD). The memory system 20 is provided outside the host 10 and is connected to the host 10 via a cable or a network. The memory system 20 may be embedded in the host 10. The memory system 20 includes a controller 22, a non-volatile memory 24, and a volatile memory 26.

The controller 22 is one integrated circuit such as a system on a chip (SoC). The controller 22 controls the operation of the non-volatile memory 24 and the volatile memory 26.

The non-volatile memory 24 is, for example, a flash memory. The non-volatile memory 24 stores data. The non-volatile memory 24 can maintain the stored data even while power is not supplied. The flash memory is, for example, a NAND type flash memory or a NOR type flash memory.

The volatile memory 26 is, for example, a dynamic random access memory (DRAM). The volatile memory 26 stores data. The volatile memory 26 can maintain the stored data only while power is supplied. The volatile memory 26 conforms to, for example, the double data rate 3 low voltage (DDR3L) standard. The volatile memory 26 may be provided in the controller 22. In such a case, the volatile memory 26 is, for example, a static random access memory (SRAM).

Next, the internal configuration of the controller 22 will be described. The controller 22 includes a host interface circuit 32 (also referred to as a host I/F circuit), a non-volatile memory interface circuit 34 (also referred to as a non-volatile memory I/F circuit), a volatile memory interface circuit 36 (also referred to as a volatile memory I/F circuit), and a processing circuit 38. The host I/F circuit 32, the non-volatile memory I/F circuit 34, the volatile memory I/F circuit 36, and the processing circuit 38 are connected to each other via a bus line 40. A part of the controller 22 may be provided outside the controller 22.

The host I/F circuit 32 is an interface conforming to a standard such as serial ATA (SATA), serial attached SCSI (SAS), UFS, PCI Express (PCIe)™, and Ethernet™. The host I/F circuit 32 connects the controller 22 and the host 10 so as to be able to communicate with each other.

The non-volatile memory I/F circuit 34 is an interface conforming to a standard such as a Toggle NAND flash interface and an open NAND flash interface (ONFI). The non-volatile memory I/F circuit 34 connects the controller 22 and the non-volatile memory 24 so as to be able to communicate with each other. The non-volatile memory I/F circuit 34 is connected to the non-volatile memory 24 via a plurality of channels Ch. A plurality of memory chips 44 are connected to each channel Ch. Alternatively, the single memory chip 44 is connected to each channel Ch.

The volatile memory I/F circuit 36 is an interface with the volatile memory 26. The volatile memory I/F circuit 36 connects the controller 22 and the volatile memory 26 so as to be able to communicate with each other.

The processing circuit 38 can execute various commands such as a read command and a write command.

Next, the internal configuration of the non-volatile memory 24 will be described. The non-volatile memory 24 includes a plurality of memory chips 44. Each memory chip 44 includes a memory cell array. The memory cell array contains a plurality of blocks. Each block contains a plurality of pages. The block functions as a processing unit for data erasure. Each page has a plurality of memory cells connected to the same word line. Data is written or read by the page. Data is written or read by the word line instead of the page.

Figure 2:
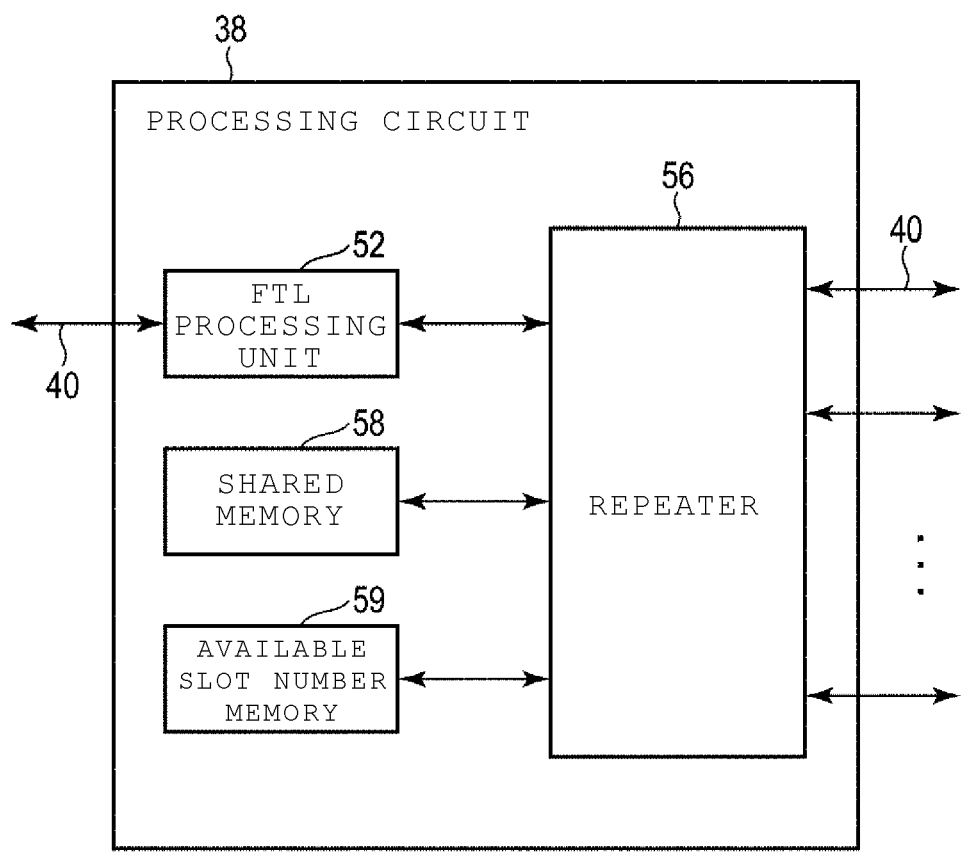
FIG. 2 is a functional block diagram illustrating a memory system according to a first embodiment.

Next, the function of the processing circuit 38 will be described. FIG. 2 is a functional block diagram illustrating an example of a functional block of the processing circuit 38 of the memory system 20 according to the first embodiment. The processing circuit 38 includes a flash translation layer processing unit 52 (also referred to as an FTL processing unit), a repeater 56 (also referred to as a dispatcher), a shared memory 58, and an available slot number memory 59.

The FTL processing unit 52 is a processor such as a central processing unit (CPU) that executes data management, block management, and command control of the non-volatile memory 24. The FTL processing unit 52 is connected to the bus line 40. The FTL processing unit 52 divides a received read command into a plurality of requests, and issues the requests to the repeater 56. Each request indicates a process to be executed by a memory chip 44. Further, the request is transmitted by the non-volatile memory I/F circuit 34 to the memory chip 44. Hereinafter, a request is referred to as a message. That is, the FTL processing unit 52 divides a received read command into a plurality of memory read messages, and issues the memory read messages to the repeater 56. Each memory read message indicates a process to be executed by the non-volatile memory I/F circuit 34 with respect to a memory chip 44.

The repeater 56 is a message routing module for configuring a message transmission/reception path. The message transmission/reception path is a message transmission path from the FTL processing unit 52 to the non-volatile memory I/F circuit 34. The repeater 56 has a plurality of input ports and a plurality of output ports. The input port is a terminal for receiving a message. The output port is a terminal for outputting a message. The repeater 56 includes a one-to-many message transmission/reception path for outputting a message received by one input port to any one of a plurality of output ports. The repeater 56 writes a message received from the FTL processing unit 52 to the shared memory 58. The repeater 56 reads a message from the shared memory 58 when it becomes a timing when the non-volatile memory I/F circuit 34 can receive a message. The repeater 56 outputs the read message to the non-volatile memory I/F circuit 34 via the bus line 40.

The shared memory 58 is a randomly accessible memory. The shared memory 58 temporarily stores a plurality of messages issued from the FTL processing unit 52. The shared memory 58 may be disposed in the repeater 56. The area in which the shared memory 58 stores one message is referred to as a slot.

Figure 3:
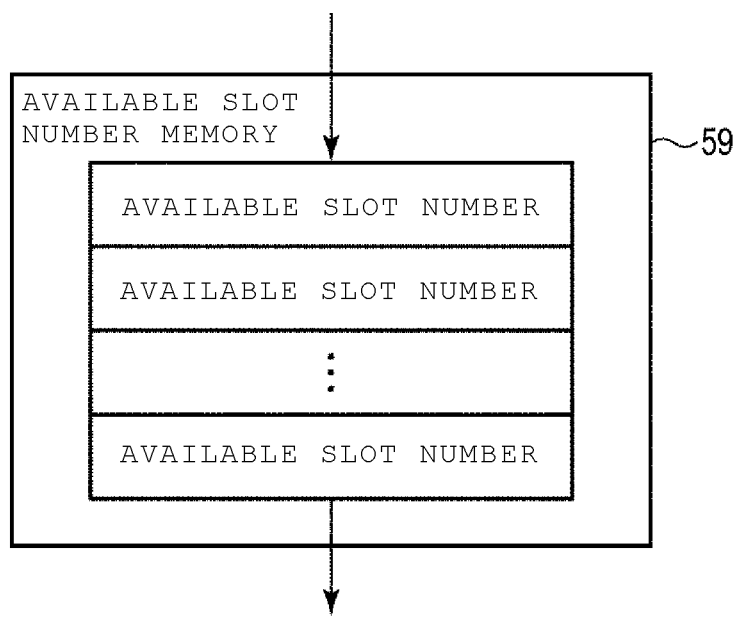
FIG. 3 depicts an available slot number memory according to a first embodiment.

FIG. 3 depicts the available slot number memory 59 according to the first embodiment. The available slot number memory 59 is a memory having a FIFO structure. The available slot number memory 59 stores available slot numbers of the shared memory 58. The available slot number represents an available slot. An available slot is a slot that does not presently store a message among those slots of the shared memory 58. The available slot number memory 59 may be disposed in the repeater 56.

Figure 4:
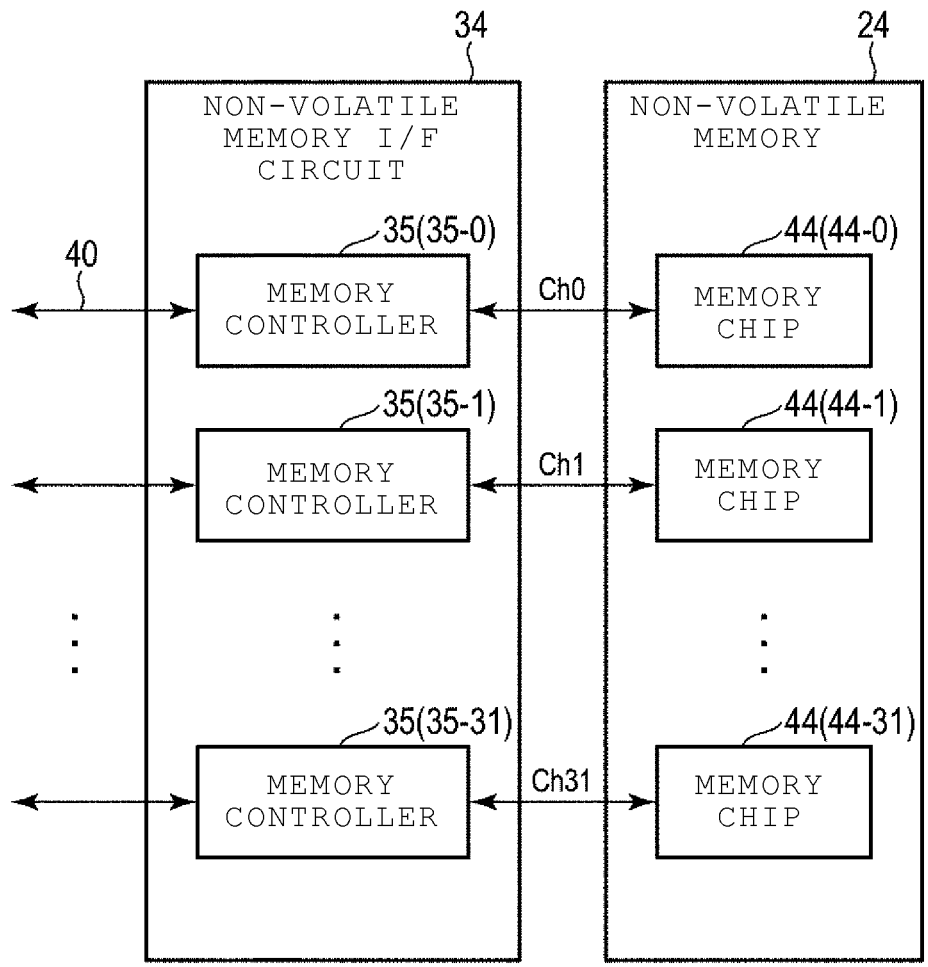
FIG. 4 is a block diagram illustrating a non-volatile memory interface (I/F) circuit and a non-volatile memory according to a first embodiment.

FIG. 4 is a block diagram illustrating the non-volatile memory I/F circuit 34 and the non-volatile memory 24 of the memory system 20 according to the first embodiment.

The non-volatile memory I/F circuit 34 includes a plurality of memory controllers 35. The memory controller 35 is connected to the repeater 56 via the bus line 40. The memory controller 35 receives a message output from the repeater 56. The number of the plurality of memory controllers 35 is equal to the number of the memory chips 44. The non-volatile memory I/F circuit 34 includes, for example, 32 memory controllers 35-0, 35-1, . . . , and 35-31.

Each memory controller 35 of the non-volatile memory I/F circuit 34 is connected to the corresponding memory chip 44 of the non-volatile memory 24 via a channel Ch. For example, the memory controller 35-0 is connected to a memory chip 44-0 via a channel Ch0. The memory controller 35-1 is connected to a memory chip 44-1 via a channel Ch1. The memory controller 35-31 is connected to a memory chip 44-31 via a channel Ch31.

Figure 5:
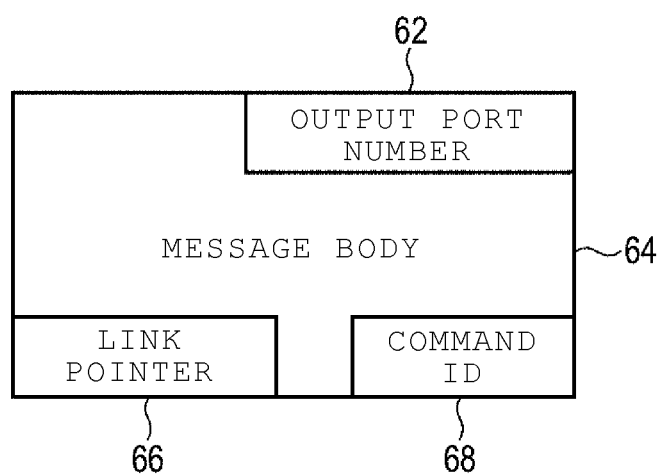
FIG. 5 depicts a data structure of a message according to a first embodiment.

FIG. 5 depicts a data structure of a message according to the first embodiment. The message is multibyte data, for example, 32 bytes of data. A plurality of messages generated from a single command may indicate processing executed by a plurality of memory chips. A plurality of messages generated from one command need to be received by the memory controller 35 in the order of being generated. The message includes an output port number 62, a message body 64, a link pointer 66, and a command ID 68.

The output port number 62 is identification information of an output port of the repeater 56.

The message body 64 is information indicating a process to be executed by a memory controller 35 with respect to the corresponding memory chip 44.

The link pointer 66 is information pointing a slot of the shared memory 58. The link pointer 66 indicates the output order of the messages output from one output port 72.

The command ID 68 is an identifier of a command. The same command ID 68 is assigned to a plurality of messages generated from one command.

Figure 6:
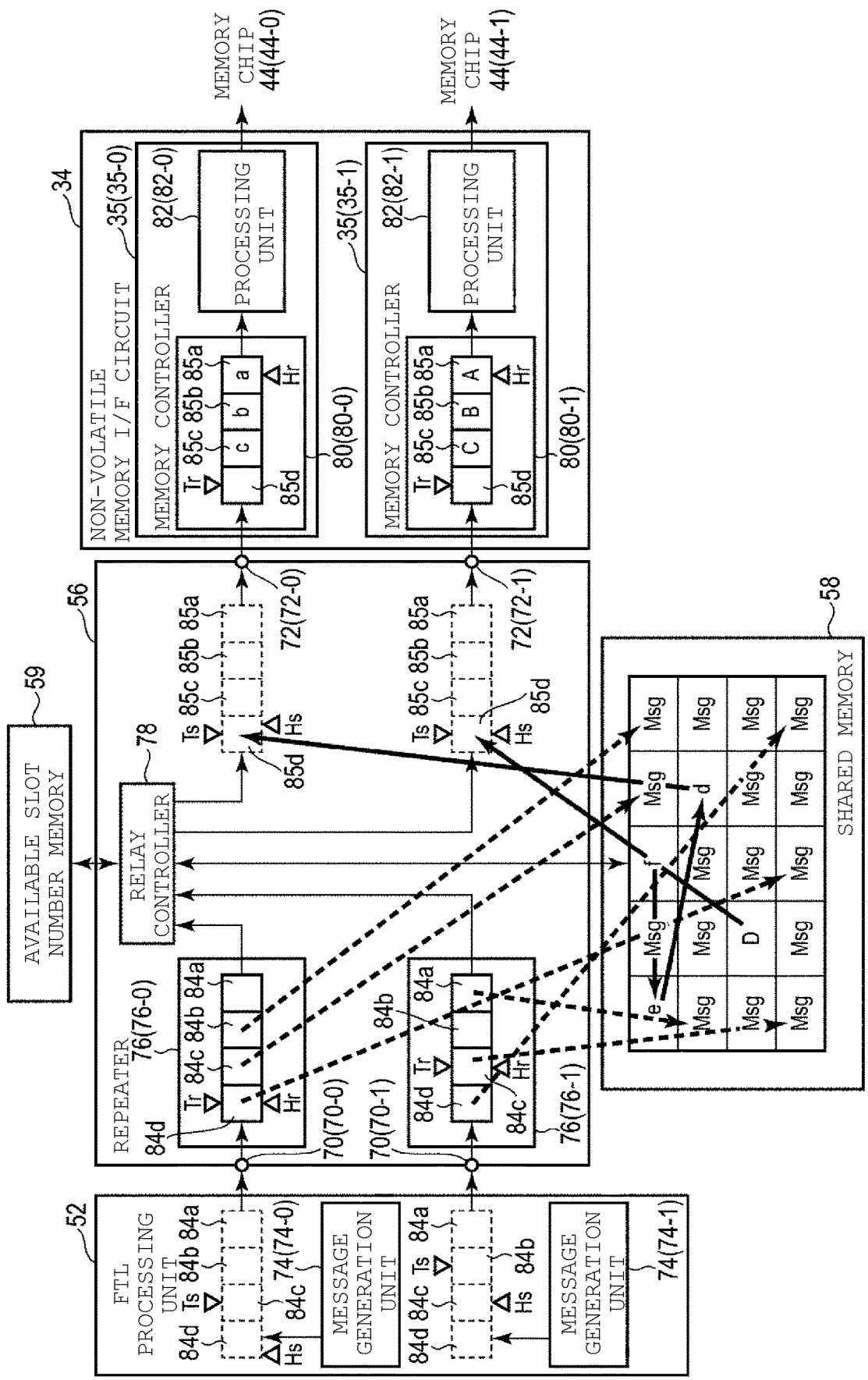
FIG. 6 is a block diagram illustrating a flash translation layer (FTL) processing unit, a repeater, a shared memory, an available slot number memory, and a memory I/F circuit according to a first embodiment.

FIG. 6 is a block diagram illustrating the FTL processing unit 52, the repeater 56, the shared memory 58, the available slot number memory 59, and the non-volatile memory I/F circuit 34 according to the first embodiment. The FTL processing unit 52 includes one or more message generation units 74. The repeater 56 includes one or more input ports 70, one or more input queues 76, a relay controller 78, and one or more output ports 72. The non-volatile memory I/F circuit 34 includes the memory controllers 35.

The message generation unit 74 divides a command into a plurality of messages. The number of message generation units 74 may be one or plural. For example, when the number of message generation units 74 is one, the FTL processing unit 52 includes a message generation unit 74-0. When the number of message generation units 74 is plural, the FTL processing unit 52 includes message generation units 74-0 and 74-1. The message generation unit 74-0 generates a plurality of first messages from a received first read command. The message generation unit 74-1 generates a plurality of second messages from a received second read command.

The input port 70 is an input terminal for receiving a message. The input port 70 is connected to the corresponding message generation unit 74. That is, the number of input ports 70 is equal to the number of message generation units 74. The number of input ports 70 may be one, two, three or more. For example, when the number of message generation units 74 is one, the input port 70 is an input port 70-0. When the number of message generation units 74 is two, the input port 70 includes input ports 70-0 and 70-1. The input port 70-0 is connected to the message generation unit 74-0. The input port 70-1 is connected to the message generation unit 74-1.

The input queue 76 is a memory having a FIFO structure and a ring buffer structure. The input queue 76 stores a plurality of messages input to the input port 70. The number of input queues 76 is equal to the number of input ports 70. The number of input queues 76 may be one, two, three or more. For example, when there is one input port 70, the input queue 76 is an input queue 76-0. When there are two input ports 70, the input queue 76 includes input queues 76-0 and 76-1. The input queue 76-0 is connected to the input port 70-0 and the relay controller 78. The input queue 76-1 is connected to the input port 70-1 and the relay controller 78.

The relay controller 78 copies a message from each input queue 76 to the shared memory 58 and copies a message from the shared memory 58 to each output port 72. The relay controller 78 is connected to the input queues 76, the shared memory 58, and the output port 72. The relay controller 78 reads a message from the input queue 76 and writes the read message to the shared memory 58. The relay controller 78 reads a message from the shared memory 58 and outputs the read message from the output port 72. By referring to the command ID 68 of the message read from the shared memory 58, the relay controller 78 can recognize that the messages having the same command ID 68 are the messages generated from the same read command. The relay controller 78 can continuously output a plurality of messages generated from one read command to the memory controller 35. The relay controller 78 writes a message Msg to the shared memory 58.

The output port 72 is a message output terminal. The number of output ports 72 is equal to the number of memory chips 44. For example, when the number of memory chips 44 is 2, the output port 72 includes output ports 72-0 and 72-1. The output port 72 is connected to the non-volatile memory I/F circuit 34. The output port 72-0 is connected to the memory controller 35-0. The output port 72-1 is connected to the memory controller 35-1.

The shared memory 58 stores a message read from the input queue 76 by the shared memory relay controller 78. The number of slots in the shared memory 58 is the maximum number of messages Msg that can be issued by the message generation unit 74 at the same time. Therefore, when the message generation unit 74 generates a message Msg, the shared memory 58 always has an available slot. The message Msg generated by the message generation unit 74 is always written to the shared memory 58.

The available slot number memory 59 is connected to the relay controller 78.

The non-volatile memory I/F circuit 34 includes a plurality of memory controllers 35. The number of memory controllers 35 is equal to the number of memory chips 44. For example, when there are two memory chips 44, the non-volatile memory I/F circuit 34 includes the memory controllers 35-0 and 35-1. The memory controller 35-0 is connected to the output port 72-0. The memory controller 35-1 is connected to the output port 72-1.

Here, the input queue 76 will be described in more detail.

The input queue 76 stores a plurality of messages. An area for storing messages is referred to as an entry. The input queue 76 includes a plurality of entries 84. The number of entries 84 is referred to as a queue depth. In the input queue 76, which has a ring buffer structure, the entries 84 are logically connected in a ring shape. For example, when the queue depth is 4, the input queue 76 includes four entries 84*a*, 84*b*, 84*c*, and 84*d*. The entry 84*b* is logically connected to the entry 84*a*, the entry 84*c* is logically connected to the entry 84*b*, the entry 84*d* is logically connected to the entry 84*c*, and the entry 84*a* is logically connected to the entry 84*d*.

The input queue 76 includes a transmitting-side head pointer Hs, a transmitting-side tail pointer Ts, a receiving-side head pointer Hr, and a receiving-side tail pointer Tr. The transmitting-side head pointer Hs, the receiving-side head pointer Hr, the transmitting-side tail pointer Ts, and the receiving-side tail pointer Tr are pointers that point to an entry 84 for storing a message.

The transmitting-side head pointer Hs is a pointer that points to an entry 84 that becomes the earliest available entry among the available entries 84. Here, an entry 84 that does not presently store any message is referred to as an available entry.

The transmitting-side tail pointer Ts is a pointer that points to the entry 84 that is the newest available entry among the available entries 84.

The receiving-side head pointer Hr is a pointer that points to an entry 84 in which a message was written at the earliest time among the entries 84 to which messages have been written. When all the entries 84 are available entries, the receiving-side head pointer Hr points to the entry 84 that is the earliest available entry among the available entries 84. In such a case, the message is written to the entry 84 pointed to by the receiving-side head pointer Hr. The message is then read from the entry 84 pointed to by the receiving-side head pointer Hr.

The receiving-side tail pointer Tr is a pointer that points to the entry 84 that is the earliest available entry among the available entries 84.

The entry 84 pointed to by the transmitting-side head pointer Hs and the transmitting-side tail pointer Ts is updated in response to the writing of a message to the input queue 76 by the message generation unit 74. The entry 84 pointed to by the receiving-side head pointer Hr and the receiving-side tail pointer Tr is updated in response to the reading of a message from the input queue 76 by the relay controller 78.

The memory controller 35 includes an output queue 80 and a processing unit 82.

The output queue 80 is a memory having a FIFO structure and a ring buffer structure. The output queue 80 stores a plurality of messages output from the output port 72. A message read from the shared memory 58 is written to the output queue 80 by the repeater 56. The message read from the output queue 80 is transmitted to the processing unit 82. The number of output queues 80 is equal to the number of output ports 72. The output queue 80 is connected to the output port 72. For example, when there are two output ports 72, the output queue 80 includes output queues 80-0 and 80-1. The output queue 80-0 is connected to the output port 72-0, and the output queue 80-1 is connected to the output port 72-1.

The processing unit 82 is a processing circuit that executes processing in response to a message. The processing unit 82 is connected to the output queue 80. For example, when there are two output queues 80, the processing unit 82 includes processing units 82-0 and 82-1. The processing unit 82-0 is connected to the output queue 80-0. The processing unit 82-1 is connected to the output queue 80-1. When the processing unit 82 completes the process in response to a previously received message, the processing unit 82 reads a next message from the output queue 80.

The output queue 80 contains a plurality of entries 85.

In the output queue 80, which is a ring buffer structure, a plurality of entries 85 are logically connected in a ring shape. For example, when the queue depth is 4, the output queue 80 includes four entries 85*a*, 85*b*, 85*c*, and 85*d*. The entry 85*b* is logically connected to the entry 85*a*, the entry 85*c* is logically connected to the entry 85*b*, the entry 85*d* is logically connected to the entry 85*c*, and the entry 85*a* is logically connected to the entry 85*d*.

The output queue 80 includes a transmitting-side head pointer Hs, a receiving-side head pointer Hr, a transmitting-side tail pointer Ts, and a receiving-side tail pointer Tr. The transmitting-side head pointer Hs, the receiving-side head pointer Hr, the transmitting-side tail pointer Ts, and the receiving-side tail pointer Tr are pointers that point to an entry 85 for storing a message.

The transmitting-side head pointer Hs is a pointer that points to an entry 85 that becomes the earliest available entry among the available entries 85.

The transmitting-side tail pointer Ts is a pointer that points to an entry 85 that becomes the newest available entry among the available entries 85.

The receiving-side head pointer Hr is a pointer that points to an entry 85 in which a message was written at the earliest among the entries 85 to which messages have been written. When all the entries 85 are available entries, the receiving-side head pointer Hr points to the entry 85 which is the earliest available entry among the available entries 85. In such a case, the message is written to the entry 85 pointed to by the receiving-side head pointer Hr. The message is then read from the entry 85 pointed to by the receiving-side head pointer Hr.

The receiving-side tail pointer Tr is a pointer that points to an entry 85 that becomes the earliest available entry among the available entries 85.

The entry 85 pointed to by the transmitting-side head pointer Hs and the transmitting-side tail pointer Ts is updated in response to the writing of a message to the output queue 80 by the repeater 56. The entry 85 pointed to by the receiving-side head pointer Hr and the receiving-side tail pointer Tr is updated in response to the reading of a message from the output queue 80 by the processing unit 82.

The operation of the input queue 76 and the output queue 80 will be described using two example in which the queue depth is 2 and the queue depth is 8.

An example of the operation of the input queue 76 and the output queue 80 when the queue depth is 2 (the number of entries is 2) will be described. Since the operation of the input queue 76 and the operation of the output queue 80 are the same, an example of the operation will be described by referring to the input queue 76 and the output queue 80 as a queue 94. FIG. 7A depicts the queue 94 in an empty state according to the first embodiment. FIG. 7B depicts the queue 94 in a full state according to the first embodiment. FIG. 7C depicts the queue 94 in another empty state according to the first embodiment. FIG. 7D depicts the queue 94 in another full state according to the first embodiment. The queue 94 contains two entries 94*a* and 94*b*. The queue 94 can store messages the number of which is less than the queue depth by one. A state where either the entry 94*a* or the entry 94*b* stores a message is referred to as a full state. A state of the queue 94 in which the entries 94*a* and 94*b* are available entries is referred to as an empty state.

In the state of FIG. 7A, the two entries 94*a* and 94*b* are available entries. The first entry 94*a* becomes an available entry first, and then the second entry 94*b* becomes an available entry. In the state of FIG. 7A, the transmitting-side tail pointer Ts points to the second entry 94*b*, and the transmitting-side head pointer Hs, the receiving-side head pointer Hr, and the receiving-side tail pointer Tr all point to the first entry 94a. When the transmitting-side head pointer Hs and the transmitting-side tail pointer Ts point to different entries, the queue 94 is not in a full state and a message can be written. When the receiving-side head pointer Hr and the receiving-side tail pointer Tr point to the same entry, the queue 94 is in an empty state and does not store any message to be read.

When a message is written to the first entry 94a in the state of FIG. 7A, the transmitting-side head pointer Hs and the receiving-side tail pointer Tr are all updated to point to the second entry 94b, the state of FIG. 7B is reached.

In the state of FIG. 7B, when the message is read from the first entry 94a, the transmitting-side tail pointer Ts is updated to point to the first entry 94a, the receiving-side head pointer Hr is updated to point to the second entry 94b, and the state of FIG. 7C is reached.

In the state of FIG. 7C, when a message is written to the second entry 94b, the transmitting-side head pointer Hs and the receiving-side tail pointer Tr are all updated to point to the first entry 94a, and the state of FIG. 7D is reached.

In a state of FIG. 7D, when the message is read from the second entry 94b, the second entry 94b becomes an available entry. As a result, the two entries 94a and 94b become available entries as shown in FIG. 7A.

Figure 8A:
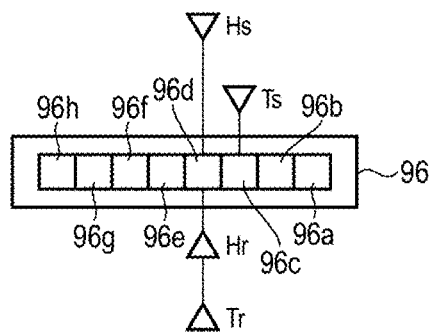
FIG. 8A depicts a queue in an empty state according to a first embodiment.
Figure 8B:
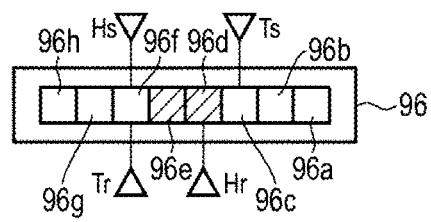
FIG. 8B depicts a queue that is neither empty nor full according to a first embodiment.
Figure 8C:
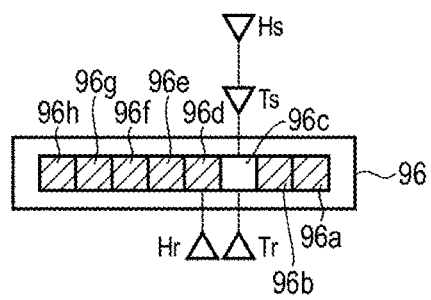
FIG. 8C depicts a queue in a full state according to a first embodiment.
Figure 8D:
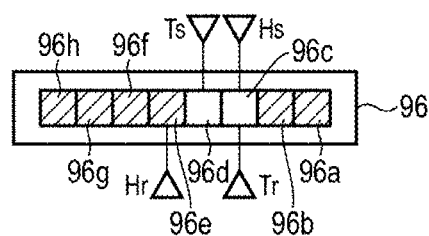
FIG. 8D depicts a queue that is neither empty nor full according to a first embodiment.
Figure 8E:
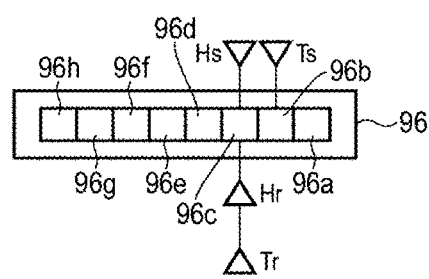
FIG. 8E depicts a queue in an empty state according to a first embodiment.

An example of the operation of the input queue 76 and the output queue 80 when the queue depth is 8 (the number of entries is 8) will be described. Since the operation of the input queue 76 and the operation of the output queue 80 are the same, an example of the operation will be described by referring to the input queue 76 and the output queue 80 as a queue 96. FIG. 8A depicts the queue 96 in an empty state according to the first embodiment. FIG. 8B depicts the queue 96 that is neither empty nor full according to the first embodiment. FIG. 8C depicts the queue 96 in the full state according to the first embodiment. FIG. 8D depicts the queue 96 that is neither empty nor full according to the first embodiment. FIG. 8E depicts the queue 96 in another empty state according to the first embodiment. The queue 96 contains eight entries 96a, 96b, 96c, 96d, 96e, 96f, 96g, and 96h.

In the state of FIG. 8A, all of eight entries 96a, 96b, 96c, 96d, 96e, 96f, 96g, and 96h are available entries. In the state of FIG. 8A, the transmitting-side tail pointer Ts points to the third entry 96c, and the transmitting-side head pointer Hs, the receiving-side head pointer Hr, and the receiving-side tail pointer Tr all point to the fourth entry 96d.

When a message is written to the fourth entry 96d and the fifth entry 96e in the state of FIG. 8A, the transmitting-side head pointer Hs and the receiving-side tail pointer Tr are all updated to point to the sixth entry 96f, and the state of FIG. 8B is reached.

In the state of FIG. 8B, when five more messages are written to the sixth, seventh, eighth, first, and second entries 96f, 96g, 96h, 96a, and 96b, the transmitting-side head pointer Hs is updated to point to the third entry 96c, the receiving-side tail pointer Tr is updated to point to the fourth entry 96d, and the state of FIG. 8C is reached.

In the state of FIG. 8C, when one message is read from the fourth entry 96d, the transmitting-side tail pointer Ts is updated to point to the fourth entry 96d, the receiving-side head pointer Hr is updated to point to the fifth entry 96e, and the state of FIG. 8D is reached.

In the state of FIG. 8D, the six messages are read from the fifth entry 96e, the sixth entry 96f, the seventh entry 96g, the eighth entry 96h, the first entry 96a, and the second entry 96b, the transmitting-side tail pointer Ts is updated to point to the second entry 96b, the receiving-side head pointer Hr is updated to point to the third entry 96c, and the state of FIG. 8E is reached.

Figure 9:
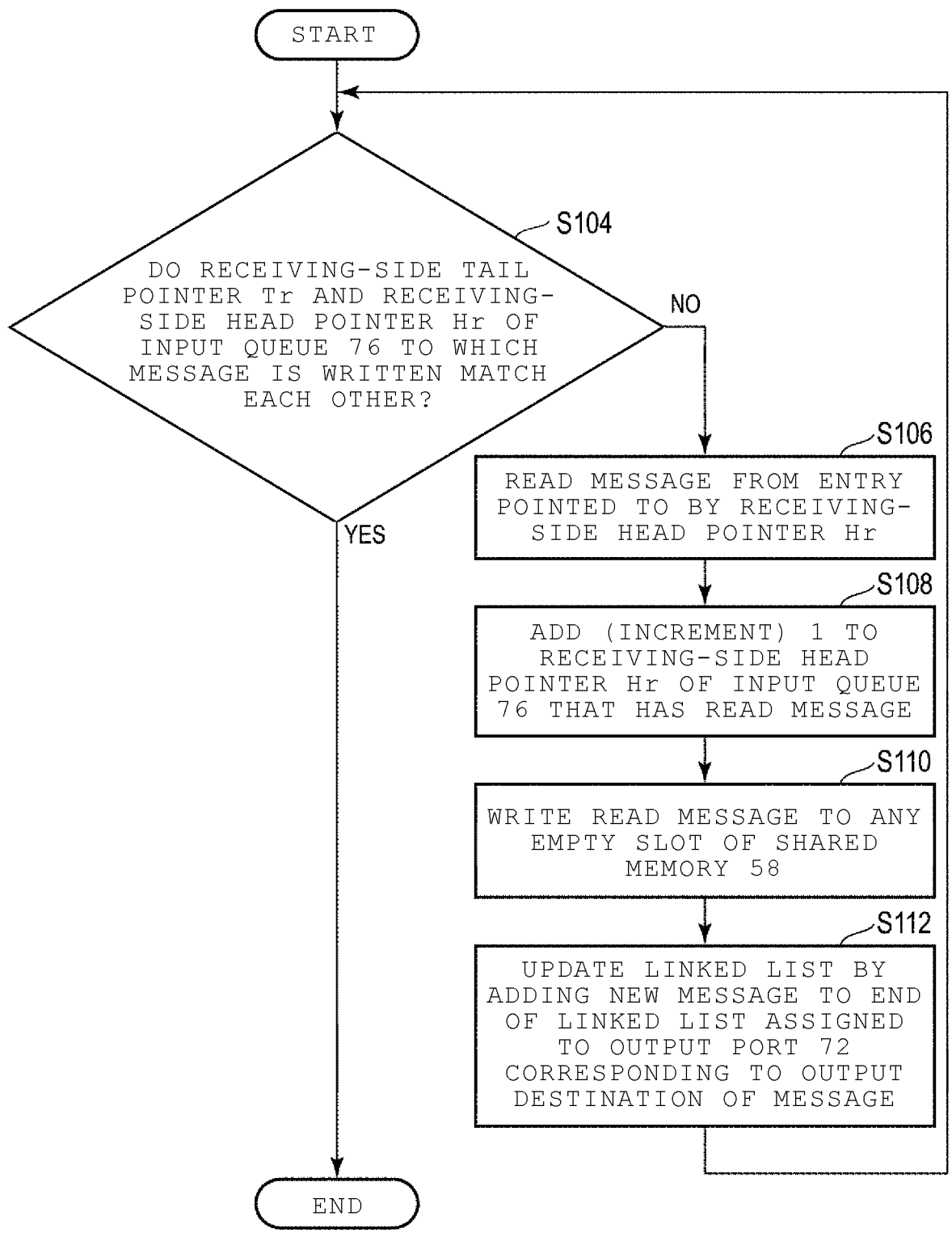
FIG. 9 is a flowchart of a message copy process from an input queue to a shared memory by a relay controller according to a first embodiment.

FIG. 9 is a flowchart of a message copy process from the input queue 76 to the shared memory 58 by the relay controller 78 according to the first embodiment.

When the processing circuit 38 detects that a message is transmitted from the FTL processing unit 52 to the repeater 56, the processing circuit 38 causes the repeater 56 to start the message copy process from the input queue 76 by the relay controller 78 to the shared memory 58 (start of FIG. 9).

The relay controller 78 determines whether the receiving-side tail pointer Tr and the receiving-side head pointer Hr in the input queue 76 to which the message has been written match each other (S104).

When the receiving-side tail pointer Tr and the receiving-side head pointer Hr in the input queue 76 to which the message has been written do not match each other (NO in S104), the relay controller 78 reads a message from the entry pointed to by the receiving-side head pointer Hr (S106).

The relay controller 78 adds one to (increments) the receiving-side head pointer Hr of the input queue 76 from which the message has been read (S108).

The relay controller 78 writes the read message to any available slot of the shared memory 58 (S110). The relay controller 78 extracts an available slot number from the available slot number memory 59, and determines an available slot according to the available slot number.

The relay controller 78 updates the linked list by adding a new message to the linked list assigned to the output port 72 corresponding to the output destination of the message (S112).

A linked list is management data having a table structure of which components are a head pointer, a tail pointer, and the number of messages. A head pointer HP is a pointer that points to a slot of the shared memory 58 that stores the message written at the earliest among the series of messages written to the shared memory 58. The tail pointer TP is a pointer that points to a slot of the shared memory 58 that stores the newest message among the series of messages written to the shared memory 58. The number of messages is a value indicating the number of a series of messages written to the shared memory 58.

After updating the linked list (S112), the relay controller 78 determines whether the receiving-side tail pointer Tr and the receiving-side head pointer Hr in the input queue 76 to which the message has been written match each other (S104).

When the receiving-side tail pointer Tr and the receiving-side head pointer Hr in the input queue 76 to which the message has been written match each other (YES in S104), the relay controller 78 finishes the message copy process from the input queue 76 to the shared memory 58.

Next, updating the linked list assigned to the output port 72-0, which is performed when the input queue 76, for example, the input queue 76-0 stores a series of messages addressed to one output port 72, for example, the output port 72-0, will be described. FIG. 10A depicts the linked list according to the first embodiment at a first timing. FIG. 10B depicts the linked list according to the first embodiment at a second timing. FIG. 10C depicts the linked list according to the first embodiment at a third timing.

For convenience of description, it is assumed that the shared memory 58 includes eight slots 58a, 58b, 58c, 58d, 58e, 58f, 58g and 58h.

At a certain timing (referred to as the first timing), the shared memory 58 does not store any message, and all the slots 58*a* to 58*h* are available slots. The head pointer HP of the linked list assigned to the output port 72-0 is a null pointer (Null), the tail pointer TP points to any slot (here, the slot 58*h*), and the number of messages is 0, as shown in FIG. 10A.

When a message belonging to a series of messages addressed to the output port 72-0 is written to the input queue 76-0, the relay controller 78 reads one message (referred to as a first message) from the input queue 76-0 and writes the read first message to any available slot (here, the slot 58*g*) of the shared memory 58.

At the subsequent timing (referred to as the second timing), the relay controller 78 performs updating such that the head pointer HP and the tail pointer TP of the linked list of the output port 72-0 point to the slot (here, the slot 58*g*) to which the first message has been written, and adds 1 to the number of messages in the linked list as shown in FIG. 10B. The initial value of the link pointer 66 of the first message is maintained at 0.

When the input queue 76 stores a message belonging to a series of messages addressed to the output port 72-0, the relay controller 78 reads a message (referred to as a second message) from the input queue 76 and writes the read message to any available slot (here, the slot 58*a*) of the shared memory 58.

At the subsequent timing (referred to as the third timing), the relay controller 78 leaves the head pointer HP of the linked list of the output port 72-0 as it is (while pointing to the slot 58*g*), and updates the linked list such that the tail pointer TP points to the slot (here, the slot 58*a*) to which the message has been written, and the number of messages is added by 1 as shown in FIG. 10C. When writing the second message to a slot 68*g*, the relay controller 78 updates the value of the link pointer 66 of the first message so as to point to the slot 58*a* to which the second message has been written. The initial value of the link pointer 66 of the second message is maintained at 0.

When the relay controller 78 reads the first message from the shared memory 58, the relay controller 78 can read the second message written to the shared memory 58 after the first message by referring to the link pointer 66 of the first message.

Figure 11:
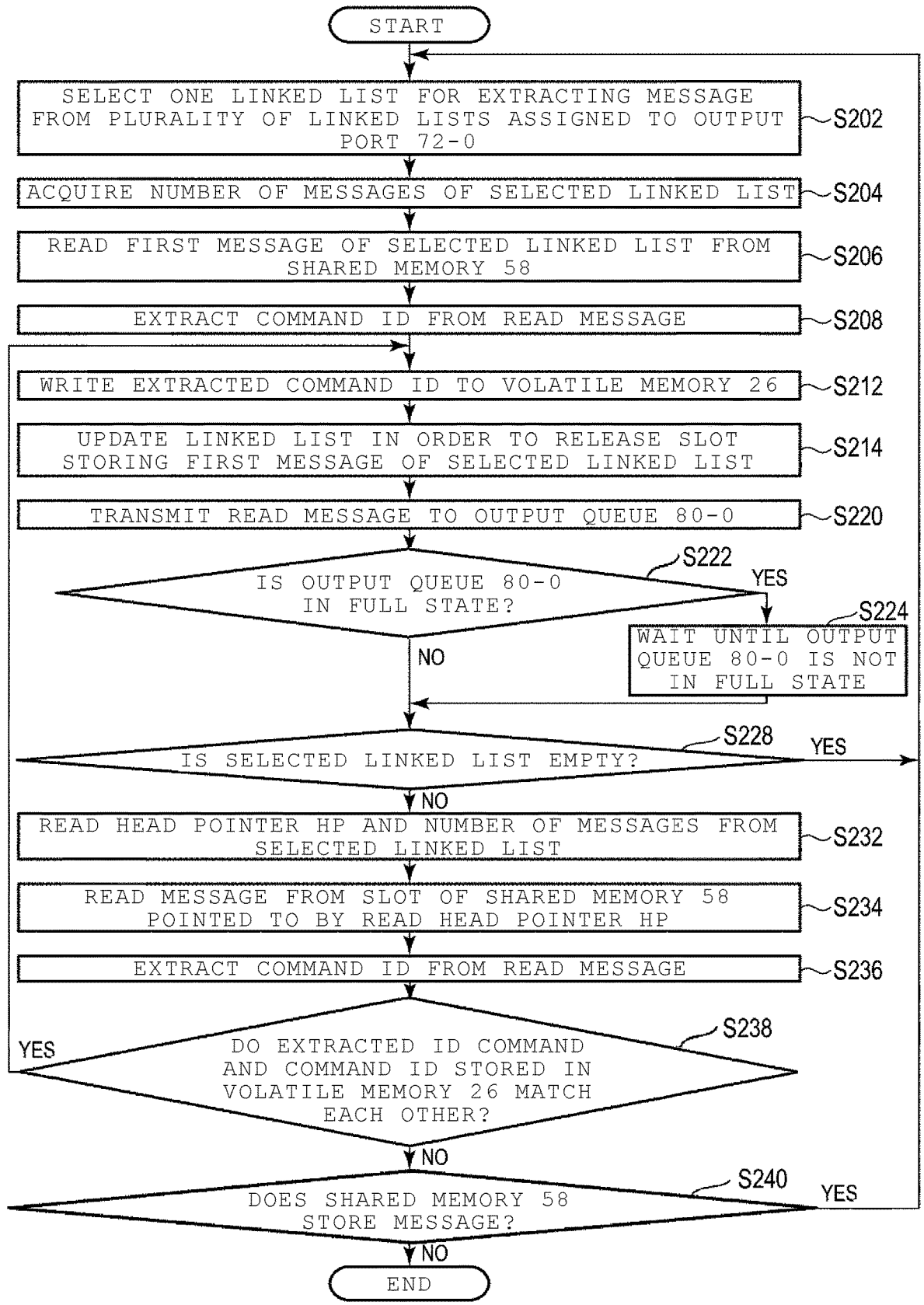
FIG. 11 is a flowchart of a message copy process from a shared memory to an output queue by a relay controller according to a first embodiment.

FIG. 11 is a flowchart of the message copy process from the shared memory 58 to the output queue 80-0 by the relay controller 78 according to the first embodiment. Here, the shared memory 58 stores one series of messages addressed to one output port 72-0.

Here, the output port 72-0 is associated with not a single linked list but multiple linked lists. This is to enable the relay controller 78 to process commands (messages) evenly among a plurality of linked lists, rather than simply processing commands (messages) in the issued order.

When the message copy process (FIG. 9) from the input queue 76 by the relay controller 78 to the shared memory 58 is finished, the processing circuit 38 causes the repeater 56 to start the message copy process from the shared memory 58 by the relay controller 78 to the output queue 80-0 (start in FIG. 11).

The relay controller 78 selects one linked list for extracting a message from the linked lists assigned to the output ports 72-0 (S202). The process of S202 is also referred to as an arbitration process of the linked list.

The relay controller 78 acquires the number of messages in the selected linked list (S204).

The relay controller 78 reads the first message of the selected linked list from the shared memory 58 (S206).

The relay controller 78 extracts the command ID from the read message (S208).

The relay controller 78 writes the extracted command ID to the volatile memory 26 (S212).

The relay controller 78 updates the linked list in order to release the slot storing the first message of the selected linked list (S214). Updating the linked list will be described later.

The relay controller 78 transmits the read message to the output queue 80-0 (S220).

The relay controller 78 determines whether the output queue 80-0 is in a full state (S222). The relay controller 78 determines whether the output queue 80-0 is in a full state depending on whether the transmitting-side head pointer Hs and the transmitting-side tail pointer Ts of the output queue 80-0 point to the same slot.

When the output queue 80-0 is in a full state (YES in S222), the relay controller 78 waits until the output queue 80-0 is not in a full state (S224).

When the output queue 80-0 is not in a full state (after NO in S222 or the end of S224), the relay controller 78 determines whether the selected linked list is empty (S228). The selected linked list is empty when the number of messages in the linked list is 0. The reason for determining whether the linked list is empty in a state where the output queue 80-0 is not full is that an opportunity for a message with the same command ID is added to the linked list while a state where the output queue 80-0 is full is shifted to a state where the output queue 80-0 is not full.

When the selected linked list is empty (YES in S228), the relay controller 78 executes the arbitration process of the linked list (S202).

When the selected linked list is not empty (NO in S228), the relay controller 78 reads the head pointer HP and the number of messages from the linked list (S232).

The relay controller 78 reads a message from the slot of the shared memory 58 pointed to by the head pointer HP (S234).

The relay controller 78 extracts the command ID from the read message (S236).

The relay controller 78 determines whether the extracted ID command and the command ID stored in the volatile memory 26 match each other (S238).

When the extracted ID command and the command ID stored in the volatile memory 26 match each other (YES in S238), the relay controller 78 writes the command ID in the non-volatile memory 26 (S212).

When the extracted ID command and the command ID stored in the volatile memory 26 do not match each other (NO in S238), the relay controller 78 determines whether the shared memory 58 stores the message (S240).

When the shared memory 58 stores the message (YES in S240), the relay controller 78 executes the arbitration process of the linked list (S202).

When the shared memory 58 does not store the message (NO in S240), the relay controller 78 finishes (ends) the process illustrated in FIG. 11.

When the shared memory 58 stores a plurality of series of messages addressed to the plurality of output ports 72, the relay controller 78 executes the process illustrated in FIG. 11 for each output port 72.

In the flowchart of FIG. 11, since a plurality of linked lists for a plurality of messages are assigned to one output port 72-0, the arbitration process (S202) is executed. When only one linked list is assigned to one output port 72-0, the arbitration process (S202) will not be executed.

Next, updating the linked list assigned to the output port 72-0, which is performed when the shared memory 58 stores a series of messages addressed to one output port 72, for example, the output port 72-0, will be described. FIG. 12A depicts the linked list according to the first embodiment at a fourth timing. FIG. 12B depicts the linked list according to the first embodiment at a fifth timing. FIG. 12C depicts the linked list according to the first embodiment at a sixth timing.

At a certain timing (referred to as the fourth timing), the shared memory 58 stores a series of two messages addressed to the output ports 72-0 in the slots 58g and 58a. Here, the first message has been written to the slot 58g, and the second message has been written to the slot 58a. The link pointer of the first message points to the slot 58a to which the second message has been written. In the linked list assigned to the output port 72-0, the head pointer HP points to the slot 58g, the tail pointer TP points to the slot 58a, and the number of messages is 2, as shown in FIG. 12A.

When the head pointer HP and the tail pointer TP of the linked list point to different slots, that is, the shared memory 58 stores two or more messages and the head pointer HP is other than a null pointer, the relay controller 78 reads a message from the slot of the shared memory 58 pointed to by the head pointer HP, and writes the read message to the output queue 80-0 via the output port 72-0. Therefore, after the fourth timing, the relay controller 78 reads the first message from the slot 58g of the shared memory 58 pointed to by the head pointer HP, writes the read message to the output queue 80-0 via the output port 72-0, and writes the slot number of the slot 58g in the available slot number memory 59 as an available slot number.

At the subsequent timing (referred to as the fifth timing), the relay controller 78 performs updating such that the head pointer HP of the linked list points to the slot 58a pointed to by the link pointer of the first message, keeps the tail pointer TP as it is (while pointing to the slot 58a), and subtracts 1 from the number of messages, as shown in FIG. 12B.

When the head pointer HP and the tail pointer TP of the linked list point to the same slot, that is, the shared memory 58 stores one message and the head pointer HP is other than a null pointer, the relay controller 78 reads a message from the slot of the shared memory 58 pointed to by the head pointer HP, and writes the read message to the output queue 80-0 via the output port 72-0. Therefore, after the fifth timing, the relay controller 78 reads the second message from the slot 58a of the shared memory 58 pointed to by the head pointer HP, writes the read message to the output queue 80-0 via the output port 72-0, and writes the slot number of the slot 58a in the available slot number memory 59 as an available slot number.

At the subsequent timing (referred to as the sixth timing), the relay controller 78 performs updating such that the head pointer HP of the linked list becomes a null pointer, keeps the tail pointer TP as it is (while pointing to the slot 58a), and subtracts 1 from the number of messages, as shown in FIG. 12C.

By executing the process of FIG. 12, a series of messages (e.g., messages "d," "e," and "f" in FIG. 6) transmitted to the memory controller 35-0 are read from the shared memory 58 in this order and written to the output queue 80-0, and the message (single message D in FIG. 6) transmitted to the memory controller 35-1 is read from the shared memory 58 and written to the output queue 80-1.

The processing unit 82 reads a message from the output queue 80 and executes processing according to the read message. When the process is completed, the processing unit 82 reads the next message from the output queue 80 and executes the next process. The process is, for example, reading and writing with respect to the memory chip 44.

The relay controller 78 writes messages received by the repeater 56 and stored in the input queues 76 to the shared memory 58 as a series of messages for each destination using a linked list indicating the transmission order for each destination. Since the shared memory 58 does not have a FIFO structure but is randomly accessible, the relay controller 78 can read a message from any slot of the shared memory 58. Therefore, when (i) the amount of the first message addressed to the output port 72-0 is extremely larger than the amount of the second message addressed to the output port 72-1, and (ii) the output queue 80-0 is in a full state, but (iii) the output queue 80-1 is not in a full state, the second message addressed to the output queue 80-1 can be read from the shared memory 58 and written to the output queue 80-1.

When the shared memory 58 is not provided and the input queues 76-0 and 76-1 store the message, if the input queue 76-0 or 76-1 stores the second message addressed to the output queue 80-1, which is not in a full state, after the first message addressed to the output queue 80-0, which is in a full state, the preceding first message cannot be skipped, and thus the subsequent second message cannot be read. As a result, the transmission of the second message is delayed, and the process of the request indicated by the second message is delayed.

Accordingly, there is no delay when the repeater 68 transmits and receives a message with respect to the non-volatile memory I/F circuit 34. Therefore, the non-volatile memory I/F circuit 34 can process a message without delay, and the performance of the memory system 20 is improved.

According to the memory system 20 according to the above-described embodiments, it is not necessary for each output queue 80 to have the maximum number of entries for the process of the system, and one shared memory 58 may have this maximum number of slots, and the amount of memory to be used is saved.

The relay controller 78 writes, to the link pointer 66 of the message written to the shared memory 58, information pointing to the slot of the shared memory 58 that stores the subsequent message. Accordingly, the relay controller 78 can read a certain message and then read a message following the message.

A modification example of writing a message to the shared memory 58 will be described. In the above-described embodiments, the message generation unit 74 once writes a message to the input queue 76, and the relay controller 78 reads the message from the input queue 76 and writes the message to the shared memory 58. In contrast, the message generation unit 74 may write the message directly to the shared memory 58. In such a case, the message generation unit 74 includes the available slot number memory 59. When it is determined whether the shared memory 58 includes an available slot by referring to the available slot number memory 59, and there is an available slot therein, the message generation unit 74 may assign one of the available slots to the message and write the message to the assigned slot. In such a case, the message generation unit 74 may notify the relay controller 78 of the slot number in which the message has been written. The relay controller 78 may update the linked list based on this notification.

The above-described embodiments are examples and the scope of the disclosure is not limited thereto.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system, comprising:
a non-volatile memory including first and second chips;
a processor configured to generate a plurality of first messages in response to a first command received from an external device, wherein the first messages include a first message addressed to the first chip and a first message addressed to the second chip; and
a repeater including a first input port to which the first messages are input, a first output port connected to the first chip, and a second output port connected to the second chip, the repeater configured to:
write the first messages input via the first input port to a shared memory,
read the first message addressed to the first chip from the shared memory when the first chip is ready for receiving a message, and output the read first message to the first chip through the first output port, and
read the first message addressed to the second chip from the shared memory when the second chip is ready for receiving a message, and output the read first message to the second chip through the second output port.

2. The memory system according to claim 1, wherein
the processor is further configured to generate a plurality of second messages in response to a second command received from the external device, the plurality of second messages including a second message addressed to the first chip and a second message addressed to the second chip,
the repeater further includes a second input port to which the second messages are input, and
the repeater is further configured to:
write the second messages input via the second input port to the shared memory, and
read the first message addressed to the first chip and the second message addressed to the first chip from the shared memory when the first chip is ready for receiving a message, and output the read first and second messages to the first chip through the first output port.

3. The memory system according to claim 2, wherein the repeater is further configured to read the first message addressed to the second chip and the second message addressed to the second chip from the shared memory when the second chip is ready for receiving a message, and output the read first and second messages to the second chip through the second output port.

4. The memory system according to claim 1, wherein the repeater is further configured to add a first pointer indicating a storage area of a next first message to be output to the first chip to each first message written to the shared memory.

5. The memory system according to claim 4, wherein the repeater is further configured to store:
a second pointer indicating a storage location of one of the first messages to be read first from the shared memory, and
a third pointer indicating a storage location of one of the first messages to be read last from the shared memory.

6. The memory system according to claim 1, further comprising:
a first queue to which the first messages are written and from which the first messages are read via the first input port in an order in which the first messages have been written.

7. The memory system according to claim 6, wherein the repeater further includes a second queue to which the first messages are input from the first queue before written to the shared memory.

8. The memory system according to claim 7, wherein the repeater further includes a third queue to which the first message addressed to the first chip is copied from the shared memory before the first message is output to the first chip.

9. The memory system according to claim 8, wherein each of the first, second, and third queues has a ring buffer structure.

10. The memory system according to claim 1, further comprising:
a memory that stores information indicating one or more available areas of the shared memory that can store messages, wherein
the repeater is further configured to update the information after reading a message from the shared memory.

11. A control method of a memory system that includes a repeater and a non-volatile memory including first and second chips, the method comprising:
generating a plurality of first messages in response to a first command received from an external device, the plurality of first messages including a first message addressed to the first chip and a first message addressed to the second chip;
inputting the first messages to a first input port of the repeater;
writing the first messages input via the first input port to a shared memory;
reading the first message addressed to the first chip from the shared memory after the first chip becomes ready for receiving a message, and outputting the read first message to the first chip through a first output port of the repeater, the first output port being connected to the first chip; and
reading the first message addressed to the second chip from the shared memory after the second chip becomes ready for receiving a message, and outputting the read first message to the second chip through a second output port of the repeater, the second output port being connected to the second chip.

12. The control method according to claim 11, further comprising:
generating a plurality of second messages in response to a second command received from the external device, wherein the second messages include a second message addressed to the first chip and a second message addressed to the second chip;
inputting the second messages to a second input port of the repeater;
writing the second messages input via the second input port to the shared memory; and
reading the first message addressed to the first chip and the second message addressed to the first chip from the shared memory after the first chip becomes ready for receiving a message, and outputting the read first and second messages to the first chip through the first output port.

13. The control method according to claim 12, further comprising:
reading the first message addressed to the second chip and the second message addressed to the second chip from the shared memory after the second chip becomes ready for receiving a message, and outputting the read first and second messages to the second chip through the second output port.

14. The control method according to claim 11, further comprising:
when writing each of the first messages to the shared memory, adding to each of the first messages a first pointer indicating a storage area of a next first message to be output to the first chip following the first message.

15. The control method according to claim 14, further comprising:
storing a second pointer indicating a storage location of one of the first messages to be read first from the shared memory, and a third pointer indicating a storage location of one of the first messages to be read last from the shared memory.

16. The control method according to claim 11, wherein the first messages are written to a first queue from which the first messages are read via the first input port in an order in which the first messages have been written.

17. The control method according to claim 16, wherein the first messages are input from the first queue to a second queue before written to the shared memory.

18. The control method according to claim 17, wherein the first message addressed to the first chip is copied from the shared memory to a third queue before the first message is output to the first chip.

19. The control method according to claim 18, wherein each of the first, second, and third queues has a ring buffer structure.

20. A memory system, comprising:
a non-volatile memory; and
a processor configured to generate a plurality of first messages in response to a first command received from an external device and a plurality of second messages in response to a second command received from the external device; and
a repeater including a first input port to which the first messages are input, a second input port to which the second messages are input, and an output port connected to the non-volatile memory, the repeater configured to:
write to a shared memory the first messages input via the first input port and the second messages input via the second input port, and
read the first and second messages from the shared memory when the non-volatile memory is ready for receiving a message, and output the read first and second messages to the non-volatile memory through the output port.

* * * * *